Figure 1:
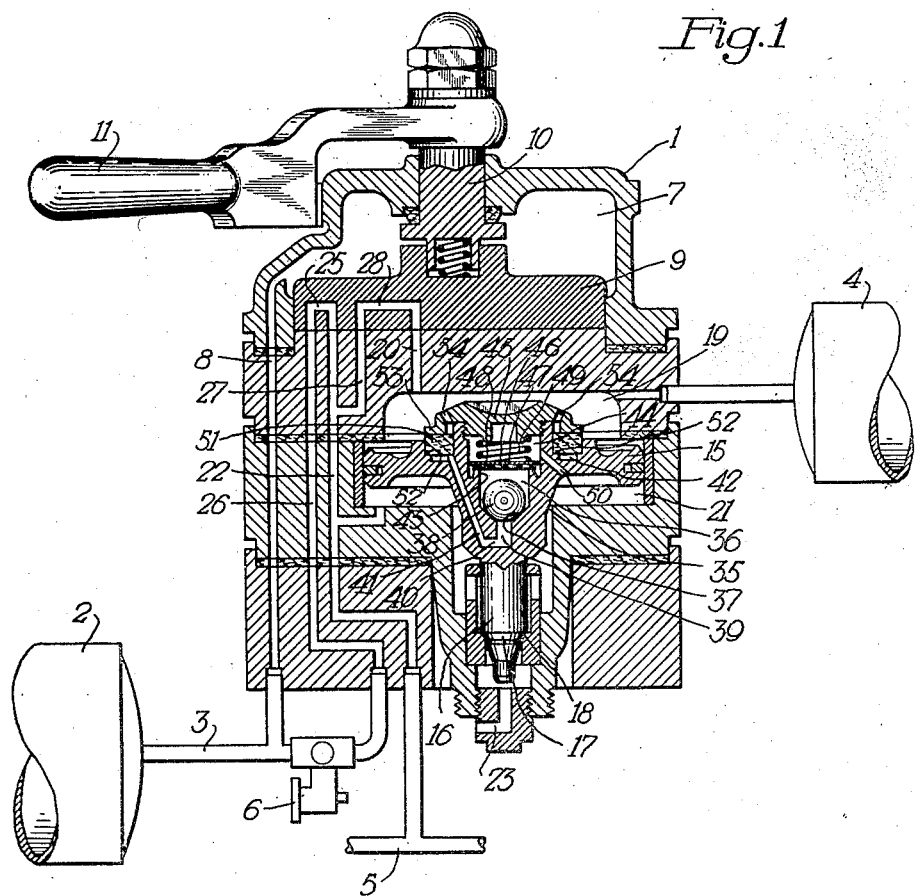

Jan. 19, 1943.  C. C. FARMER  2,308,870

EQUALIZING VALVE DEVICE

Filed Nov. 26, 1941

INVENTOR
Clyde C. Farmer
BY
ATTORNEY

Patented Jan. 19, 1943

2,308,870

UNITED STATES PATENT OFFICE 2,308,870

EQUALIZING VALVE DEVICE

Clyde C. Farmer, Pittsburgh, Pa., assignor to The Westinghouse Air Brake Company, Wilmerding, Pa., a corporation of Pennsylvania Application November 26, 1941, Serial No. 420,475

5 Claims. (Cl. 303—55)

This invention relates to locomotive fluid pressure brake equipment and more particularly to equalizing discharge valve mechanisms such as employed in engineer's automatic brake valve devices for operating upon a service reduction in pressure in an equalizing reservoir to effect a service reduction in pressure in a brake pipe and thereby a service application of brakes on the locomotive and cars of a train.

When fluid under pressure is supplied to the brake pipe of a fluid pressure brake system, either during initial charging of the brake pipe or for effecting a release of brakes, fluid under pressure is at the same time supplied to the equalizing reservoir, and in order to avoid certain well known difficulties, it is desirable that the pressure obtained in said reservoir during charging of the brake pipe shall not materially exceed that obtaining in the brake pipe.

In Patent 2,052,177 issued to Ellis E. Hewitt on August 25, 1936, there is disclosed an equalizing discharge valve mechanism embodying a check valve controlled communication arranged to permit flow of fluid under pressure from the equalizing reservoir to the brake pipe so that during charging of the brake pipe and said reservoir, the pressure in the reservoir will be of substantially the same degree as in the brake pipe. The check valve in this communication is adapted to prevent flow of fluid under pressure from the brake pipe to the equalizing reservoir, so that the pressure in said reservoir may be reduced to cause operation of the discharge valve mechanism to effect a reduction in brake pipe pressure to cause an application of brakes. In case, however, a particle of dirt should become lodged so as to prevent seating of the check valve at a time when attempting to effect a service reduction in pressure in said reservoir, fluid under pressure would flow from the brake pipe to said reservoir and thus delay or might even prevent obtaining such a reduction and thereby the desired service application of brakes. If the engineer were operating a brake valve device to effect this reduction in pressure in the equalizing reservoir and noted for instance that the equalizing discharge valve failed to open, he could of course move the brake valve device to emergency position and effect an emergency application of the brakes and thereby possibly ensure the safety of the train.

Certain locomotive brake equipments are however arranged for automatic control from track signal circuits or the like and are adapted to operate upon a certain change in such circuits to effect a service application of brakes. In such brake equipments the possibility of failure of the equalizing discharge valve mechanism as above described cannot therefore be permitted.

Thus, while a discharge valve mechanism such as disclosed in the above referred to patent can be used with reasonable safety in locomotive brake equipments not adapted for automatic control from track circuits or the like, it has been considered undesirable to use it in automatic train control locomotive equipments even though the benefit to be derived from such a mechanism are desirable in such automatic equipment.

The principal object of the invention is therefore the provision of an equalizing discharge valve mechanism of the type adapted to prevent overcharging of an equalizing reservoir but so constructed as to ensure that the communication between the brake pipe and equalizing reservoir will be closed at the time of effecting a service reduction in pressure in the equalizing reservoir so as to thereby ensure that the mechanism will always operate as intended and therefore be as safe for use in automatic train control equipment as the mechanisms heretofore used which did not embody the desirable feature of preventing overcharge of the equalizing reservoir, as above described.

According to this object two check valves are arranged in series in a communication through the equalizing discharge valve piston through which fluid under pressure is adapted to flow from the equalizing reservoir to the brake pipe. It is very unlikely that a particle of dirt will become lodged under both check valves at the same time so that the possibility of the communication containing the check valves being open at the time a reduction in equalizing reservoir pressure is being effected is very remote. In addition to these check valves however, an air strainer is provided to remove all foreign matter from the air which will come in contact with the check valves; so as to thereby ensure that there will be no particles of dirt reaching the check valves for holding same unseated. The improved structure may therefore be used in connection with automatic train control equipment and will be just as dependable as mechanisms here before used.

Of particular importance is the novel structure which permits the use of a relatively large air strainer in a relatively small device so as to ensure long efficient life of the strainer before possibly becoming clogged and requiring cleaning or renewal. Of further importance is the fact that collected dirt in the strainer can not cause failure of the mechanism to respond to a service reduction in equalizing reservoir pressure and even if the strainer becomes completely clogged with dirt the mechanism will still operate as efficiently as a mechanism not embodying either the strainer or check valve controlled communication providing for the dissipation of excess fluid from the equalizing reservoir.

Other objects and advantages will be apparent from the following more detailed description of the invention.

Figure 2:
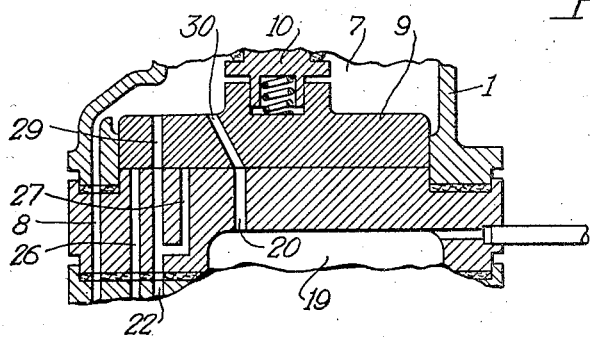

In the accompanying drawing, Figure 1 is a view of certain parts of a locomotive brake system including an engineer's automatic brake valve device, shown mainly in section and embodying the invention, the brake valve device being shown in running position; and Figure 2 is a view of a portion of the brake valve device shown in Figure 1 but in release position.

As shown in the drawing, the invention is preferably associated with an equalizing brake pipe discharge valve mechanism of a fluid pressure brake system for the purpose of illustrating one use thereof. This brake system comprises an automatic brake valve device 1, a main reservoir 2 adapted to be charged with fluid under pressure in the usual manner and from which such fluid is adapted to be supplied to a main reservoir pipe 3, an equalizing reservoir 4, a brake pipe 5, and a feed valve device 6 for supplying fluid at reduced pressure from the main reservoir pipe 3 to the brake valve device 1 for charging said equalizing reservoir and brake pipe.

The brake valve device 1 comprises a casing having a rotary valve chamber 7 which is adapted to be constantly supplied with fluid from the main reservoir 2 through pipe 3 and a passage 8. The chamber 7 contains a rotary valve 9 which is operatively connected through a shaft 10 to a handle 11. The rotary valve may be turned by handle 11 to the usual operating positions viz., release, running, lap service and emergency for controlling the application and release of brakes on a train. Since, however, only the release and running positions, shown in Figs. 1 and 2, are pertinent to the invention, a showing of the other positions in the drawing has been omitted.

The brake valve device also comprises an equalizing discharge valve mechanism, constructed in accordance with the invention, and comprising generally an equalizing piston 15 and a stem 16 depending therefrom and having formed on its lower end a brake pipe discharge valve 17 adapted to cooperate with a valve seat 18.

The piston 15 has at its upper face a chamber 19 in permanent communication with equalizing reservoir 4 and also connected by a passage 20 to the seat of rotary valve 9. At the lower face of piston 15 is a chamber 21 which is in constant communication with a passage 22 connecting the brake pipe 5 to the seat of rotary valve 9. The brake pipe discharge valve 17 controls communication between the chamber 21 and thereby the brake pipe 5 and a brake pipe discharge passage 23 leading to the atmosphere. Upon a reduction in equalizing reservoir pressure in piston chamber 19, the piston 15 is adapted to move upwardly for unseating the discharge valve 17 to thereby permit a corresponding reduction in pressure in the brake pipe. When the brake pipe pressure is thus correspondingly reduced the piston 15 is adapted to effect seating of the discharge valve 17. These operations are so well known that a more detailed description is not necessary herein.

With the rotary valve 9 in running position shown in Figure 1, a cavity 25 in said valve connects a passage 26 leading to the feed valve device 6 to the brake pipe charging passage 22 so as to supply fluid at the pressure supplied by the feed valve device to said brake pipe and to piston chamber 21 for charging same. At the same time as fluid under pressure is thus supplied to the brake pipe, fluid under pressure also flows from passage 22 through a branch 27 to the seat of rotary valve 9 and thence through a cavity 28 in said valve and passage 20 to the equalizing piston chamber 19 and equalizing reservoir 4 for charging said chamber and reservoir.

In release position of the rotary valve 9, shown in Figure 2, fluid at the pressure supplied from the main reservoir 2 to the rotary valve chamber 7 is supplied therefrom through a port 29 in the rotary valve and passage 22 to the equalizing piston chamber 21 and brake pipe 5, and also through a port 30 in the rotary valve and passage 20 to the equalizing piston chamber 19 and reservoir 4 for charging same.

As well known, it is usually customary in effecting a release of brakes to first use the release position of the brake valve device for supplying fluid directly from the main reservoir to the brake pipe for obtaining a fast increase in pressure therein to provide as quick a release of brakes as possible. After a certain time in the release position it is then customary to move the rotary valve 9 to the running position for completing the charging operation and for maintaining the pressure in the brake pipe.

Particularly during the initial portion of a brake pipe charging period, there is a relatively rapid flow of the fluid supplied to the brake pipe at the locomotive back through the brake pipe toward the rear of the train which retards the increase in brake pipe pressure at the locomotive. At the same time the supply of fluid to the equalizing piston chamber 19 and reservoir 4 tends to cause an increase in pressure therein to a degree exceeding that obtaining in the brake pipe and acting on the opposite side of the equalizing piston 15. As well known, it is undesirable for the pressure in the equalizing piston chamber 19 and reservoir 4 to exceed to any material degree the opposing brake pipe pressure in chamber 21 during charging of the brake pipe, and this is prevented in accordance with the invention, which will now be described.

According to the invention the equalizing piston 15 and discharge valve stem 16 are made integral with an enlargement 35 adjacent the piston. In this enlargement is a chamber 36 having at its lower end an annular valve seat 37 and containing a ball check valve 38 adapted under the action of gravity to engage said heat. Opening centrally through the seat 37 is a vertical passage 39 which is connected by a short horizontal passage 40 to a diagonally extending bore 41 which leads to a chamber 42 formed in the upper face of the piston 15.

The check valve chamber 36 is of uniform diameter to permit installation of check valve 38 and opens at its upper end centrally through an annular seat rib 43 to a larger and coaxially arranged chamber 44 which opens through the upper face of the piston, the upper open end of chamber 44 being closed by a cap nut 45 having screw-threaded engagement with the upper portion of the wall of chamber 44.

A check valve 46 comprising a metal disc 47 and a resilient sealing element 48 preferably made of a material such as rubber and secured to one side of disc 47, is slidably mounted in chamber 44 with the sealing element 48 disposed to engage the annular seat rib 43. A light bias spring 49 is interposed between the disc 47 and cap nut 45 for urging the check valve 46 into sealing contact with the rib 43. The chamber 44 is in constant communication through a port 50 with the equalizing piston chamber 21 and thereby brake pipe 5.

The annular chamber 42 in the upper face of the piston is open at its upper end to a coaxially arranged annular chamber in which is disposed an air filtering element or ring 51 made of any suitable material such as felt, for removing foreign matter from a stream of air. The ring 51 and the chamber containing same have a greater outside diameter than chamber 42 and a smaller inside diameter to provide two shoulders 52 upon which the ring 51 is supported. An annular flange 53 formed integral with the nut 45 engages the opposite side of the ring 51 whereby the ring is clamped between the shoulders 52 and nut flange 53 when the nut is applied to the piston.

When the nut 45 is screwed home as shown in the drawing the flange 53 is spaced from the piston thereby exposing a relatively large portion of the peripherial area of ring 51 to chamber 19 for the flow of fluid under pressure from said chamber to chamber 42. The nut flange 53 is also provided with a plurality of bores 54 connecting chamber 19 to an annular top portion of ring 51 within the flange 53 to also provide for the flow of air from chamber 19 to chamber 42.

In operation, it will be seen that if in charging the brake pipe the pressure of fluid in the equalizing reservoir 4 and equalizing piston chamber 19 increases to a degree exceeding the pressure of the light bias spring 49 on check valve 46, said check valve will be unseated and the excess pressure in said chamber and reservoir will then be dissipated to the brake pipe by flow through the strainer ring 51 past the ball check valve 38, the disc check valve 46 to chamber 44 and thence through port 50 and chamber 21. It will therefore be evident that the fluid in the equalizing reservoir 4 and equalizing piston chamber 19 cannot exceed that in the brake pipe during charging of the brake pipe by a degree greater than that determined by spring 49.

During flow of fluid under pressure past the check valves 38 and 46 to the brake pipe the strainer ring 51 will remove foreign matter from the air before it comes in contact with said check valves so that when the flow past the check valves to the brake pipe ceases, said check valves and the seats therefore will be free of foreign matter and permit leak tight contact between said check valves and seats so as to ensure against flow of fluid in the reverse direction upon effecting a reduction in pressure in the equalizing reservoir.

Since the strainer ring 51 is relatively large for the purpose intended and since a relatively large portion of its area is open to the chamber 19 at one side and chamber 42 at the opposite side, said ring will efficiently function for a relatively long period of time to provide for flow of fluid under pressure from the equalizing reservoir to the brake pipe as desired. In case the ring 51 should become clogged by foreign matter however, the communication through the piston will merely be closed, but this will have no effect upon response of the equalizing piston to a reduction in pressure in the equalizing reservoir for effecting an application of brakes, as is desired to ensure the safety of a train.

If for any reason a particle of foreign matter should however get on the check valve side of the strainer ring 51, it might become lodged on the seat of one of the check valves 38 or 46 as will be apparent. One of these check valves might then be held from its seat but this would be immaterial as long as the other is capable of obtaining leak tight contact with its seat. The possibility of both check valves being unseated by foreign matter at the same time is very remote as will be apparent.

Thus, the use of the two check valves in combination with the air strainer 51 in an equalizing discharge valve mechanism provides for the dissipation of excess fluid from the equalizing reservoir to the brake pipe as desired, and also practically eliminates the possibility of failure of the device to respond to a reduction in pressure in the equalizing reservoir for effecting a service application of brakes. This improved structure is therefore just as dependable for use in connection with automatic train control equipment as structure heretofore used and in addition permits attaining in such use a desirable feature heretofore limited to manually controlled brake valve devices.

Having now described my invention, what I claim as new and desire to secure by Letters Patent, is:

1. In combination, an equalizing piston having a communication therethrough providing for flow of fluid under pressure in the direction from one side of said piston to the opposite side, said communication including two check valve chambers, the fluid flow in said one direction occurring first through one of said chambers and then the other, a check valve in each chamber adapted to block flow of fluid under pressure in the opposite direction, and an air strainer disposed in said piston ahead of said check valves with respect to said one direction of flow of fluid for removing foreign matter from the fluid pressure flowing through said communication.

2. In combination, an equalizing piston having two concentrically arranged but separate chambers open at one face of said piston, the inner chamber constituting a check valve chamber having at one end an annular valve seat, and the outer chamber constituting fluid pressure supply chamber, an air strainer mounted against said one face of said piston closing the open end of said supply chamber, closure means closing the open end of said check valve chamber and securing said air strainer against said piston, a passage connecting said supply chamber through said valve seat to said check valve chamber, a conduit connecting the opposite face of said piston to said check valve chamber outside of said valve seat and a check valve in said check valve chamber adapted to cooperate with said valve seat to block flow of fluid under pressure in the direction from said conduit to said passage and adapted to open to provide for flow of fluid in the opposite direction from said one face of said piston to said opposite face.

3. In combination, an equalizing piston having two concentrically arranged but separate chambers open at one face of said piston, the inner chamber constituting a check valve chamber having at one end an annular valve seat, and the outer chamber constituting a fluid pressure supply chamber, a ring shaped air filter element mounted against said one face of said piston closing the open end of said supply chamber, a member secured to said piston closing the open end of said valve chamber and having an outwardly extending part engaging a portion of the outer face of said filter element securing same against said piston face, said check valve chamber having an inlet passage opening axially through said valve seat and connected to said supply chamber and having an outlet leading to the opposite face of said piston, and a check valve in said valve chamber adapted to cooperate with said valve seat to close communication between said inlet passage and said outlet and movable from said seat by fluid pressure supplied through said air filter element and inlet passage to provide for flow of said fluid to said check valve chamber and thence through said outlet to said opposite face of said piston.

4. An equalizing discharge valve mechanism for a fluid pressure brake system comprising an equalizing piston; a stem projecting from one face thereof, said piston having centrally a valve chamber extending into said stem and open at the opposite face of said piston and also having another end coaxially arranged chamber separate from said valve chamber and also open to said opposite face of said piston the last named chamber constituting a fluid pressure supply chamber, a ring shaped air filter element mounted against said piston closing the open end of said supply chamber, a member secured to said piston closing the open end of said valve chamber and engaging the outer face of said filter element securing same against said piston, a passage extending through said piston and stem connecting said supply chamber to said valve chamber, a conduit connecting said valve chamber to said one face of said piston, and a check valve in said valve chamber arranged to block flow of fluid under pressure in the direction from said conduit to said passage but to open under the pressure of fluid supplied to said passage to provide for the flow of such fluid through said passage and conduit to said one face of said piston.

5. An equalizing discharge valve mechanism for a fluid pressure brake system comprising an equalizing piston, a stem projecting from one face thereof, said piston having two separate chambers arranged concentric with said piston and open at the opposite face of said piston, the inner one of said chambers constituting a check valve chamber having at its inner end an annular valve seat and being open at all times outside of said seat to said one face of said piston, the outer one of said chambers constituting a fluid pressure supply chamber, a ring shaped filter element disposed against said piston closing the open end of said supply chamber, means closing the open end of said valve chamber and securing said filter element against said piston, said piston stem having a valve chamber in coaxial relation with and open at one end through said annular valve seat to the valve chamber in said piston and having at the opposite end an annular valve seat, a passage connecting said supply chamber through the last named valve seat to the valve chamber in said stem, a check valve in each valve chamber arranged to cooperate with the valve seat therein to block flow of fluid under pressure in the direction from the stem side of said piston to said filter element and being movable from their respective seats by pressure of fluid supplied through said filter element to open communication between the opposite sides of said piston in the opposite direction.

CLYDE C. FARMER.